(12) United States Patent
Lapointe

(10) Patent No.: US 8,905,696 B2
(45) Date of Patent: Dec. 9, 2014

(54) EXTENSION FASTENER FOR PORTABLE TOOL

(71) Applicant: Denis Lapointe, Saint-Simon-les-Mines (CA)

(72) Inventor: Denis Lapointe, Saint-Simon-les-Mines (CA)

(73) Assignee: Denis Lapointe, Saint-Simon-les-Mines (CA)

(*) Notice: Subject to any disclaimer, the term of this patent is extended or adjusted under 35 U.S.C. 154(b) by 117 days.

(21) Appl. No.: 13/684,666

(22) Filed: Nov. 26, 2012

(65) Prior Publication Data

US 2014/0147229 A1 May 29, 2014

(51) Int. Cl.
*B25G 3/00* (2006.01)
*F16B 25/00* (2006.01)
*B25F 1/00* (2006.01)

(52) U.S. Cl.
CPC . *F16B 25/00* (2013.01); *B25F 1/00* (2013.01); *B25G 3/00* (2013.01)
USPC .................. 411/386; 30/340; 16/426; 16/427

(58) Field of Classification Search
USPC .............. 411/406, 389, 409, 386, 400, 401; 30/123, 340, 344, 514, 296.1–298; 16/422, 426, 427, DIG. 24
See application file for complete search history.

(56) References Cited

U.S. PATENT DOCUMENTS

| | | | | |
|---|---|---|---|---|
| 179,927 A * | 7/1876 | Leonard | ........................ | 279/99 |
| 183,151 A * | 10/1876 | Frfry | ........................ | 279/105 |
| 660,204 A * | 10/1900 | Seelye | ........................ | 7/145 |
| 3,481,038 A * | 12/1969 | Cooper | ........................ | 30/344 |
| 3,627,007 A * | 12/1971 | Rieffer | ........................ | 30/308.1 |
| 4,030,150 A * | 6/1977 | Fisher | ........................ | 7/145 |
| 4,411,068 A * | 10/1983 | Theodorides | ........................ | 30/166.3 |
| 5,860,216 A * | 1/1999 | Shellnutt | ........................ | 30/296.1 |
| 6,623,182 B2 * | 9/2003 | Tatera | ........................ | 396/428 |
| 6,742,264 B1 * | 6/2004 | Urion | ........................ | 30/340 |
| 2007/0000359 A1 * | 1/2007 | Tansbo et al. | ........................ | 81/427.5 |

* cited by examiner

*Primary Examiner* — Flemming Saether

(57) ABSTRACT

An extension fastener for a portable light and compact tool is described. The housing of the tool, or the useful part of it encompasses a self-taping screw. The termination of the self-taping screw is secured to a base plate and extends perpendicular thereto to provide a firm support. The tool is fasten to a support taken from surrounding vegetation, such as a branch from a tree and of any diameter, or a machined wood extension member in order to increase the tool reach.

4 Claims, 3 Drawing Sheets

EXTENSION FASTENER FOR PORTABLE TOOL

TECHNICAL FIELD

This invention relates to an extension fastener for a portable tool. The principle allows the use to extend the length and reach of the portable tool over longer distances and reach. It becomes The extension fastener makes it possible to affix the tool to all types of machined or natural extensions. The tool is very compact since the fastener is a small screw and can be part of the tool handle or secured directly on the useful part of the tool.

BACKGROUND ART

For many users such as hunters, outdoor enthusiasts and workers, it is common to use compact tools for ease of carrying. A pruning tool as an example, there are non-compact models as described in patent U.S. Pat. No. 50,840,975 granted on 4 Feb. 1992. Despite several improvements, the large size remains an annoying characteristic for many occasions as they are cumbersome. It therefore becomes inconvenient to carry this kind of tool despite its usefulness. Users will turn to compact tools like a folding saw, pocket knife or other smaller size sharp tools. This kind of saw is described in patent USD346937 granted 17 May 1994. The size of this saw makes it possible to place it in a pocket or a backpack. However, responding to the need of facilitating carrying, the reach of the tool is very short and it becomes impossible to use for working on vegetation located beyond a few feet of the user.

In the hunting context in particular, surrounding vegetation in shooting lanes often located up high and around a tree stand changes rapidly due to natural elements such as tree growth, wind and ice. Hunting site preparation may therefore become necessary just minutes prior to hunting from the stand and needs to be done quickly and with a silent approach. As hunting sites are often located deep into the forest and generally require many minutes of walk to get to, it is important to use a very compact and lightweight tool that can be carried into a backpack or inside a coat pocket. It therefore becomes obvious to use the saw with an extension fastener that can quickly be converted into a pruning tool to cut vegetation located more than two meters from the tree stand without having to carry extension poles to the site. To avoid injuries or incidents that may interfere with the activity, the tool with an extension fastener must be secure during transport and cutting. The extension fastener must be reliable, sturdy and quick to install. It is unthinkable to have a fastener requiring more than a few minutes to set up. We must also be able to use materials available on site and thereby reduce the amount of luggage and tools to carry. Since this product is an accessory, it must be inexpensive and simple to manufacture. The above described tool is a pruner and is used as an example since other tools could be equipped with such an extension fastener.

BRIEF SUMMARY OF THE INVENTION

It is a feature of the present invention to provide an extension fastener for a portable tool which can meet the various criteria mentioned above.

According to the above feature, the invention provides a simple way to connect with an extension of natural origin or not. The most common situation being the use of surrounding vegetation of any diameters. It would therefore be possible to transform branches or small trees into an extension for the tool to use. This feature makes carrying a small portable tool possible, such as a folding saw for example, for converting into a long reach pruner. It is obvious that machined wooden extensions are also usable for the same function and would be better suited to the reality of users outside of the forest.

The extension fastener adds very little weight to the construction of the housing to facilitate the carrying of the tool. The base of the saw housing or, the useful part of the tool mounted with a self-tapping screw. The latter can be fixed or pivoting towards the inside of the housing to secure the tool for transport and for use for short reach. Transformation of the tool, for example, into a long reach pruner, is ensured by the use of vegetation such as a branch or small tree of various species and of any diameters into which the screw is firmly inserted. Rotation to screw the fastener into a branch of right diameter is facilitated by a firm grip of the handle or the useful part of the tool. This natural extension or not, comes to rest firmly against the flat base of the housing, here called, the base plate, to ensure a resistance in traction and compression during the back and forth movements necessary for the cutting. The base plate also distributes lateral loads when its surface is of circular shape or has a certain width. The conversion of the compact saw into a pruner is very quick and simple as all is required is to cut a section of vegetation of the wanted length (for example, eight feet) across its diameter, and to screw the fastener into one extremity of the improvised pole. The parameters of this fastener and the different possible versions will be more fully described in the detailed description. To ease the description, examples will focus essentially on the fastener for a portable saw, but the principle can apply to other tools.

DETAILED DESCRIPTION OF THE INVENTION

Figure 1:
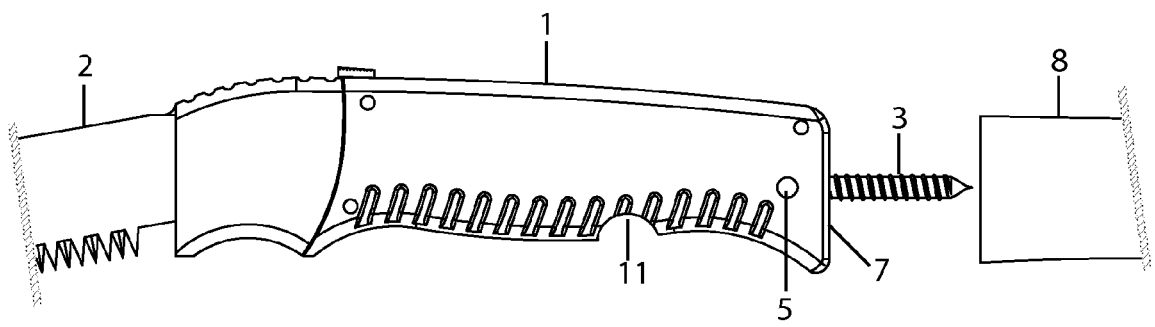
FIG. 1 is a side view example of the extension fastener for portable tool attached to the base of the housing with the features of the present invention.
Figure 3:
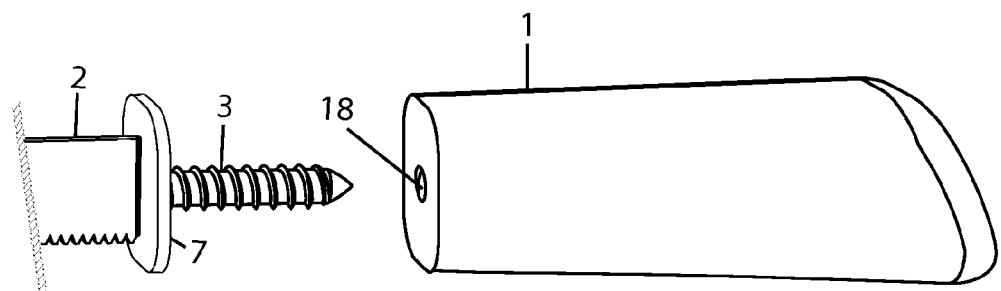
FIG. 3 is a perspective view of an example of the extension fastener for portable tool attached directly to the useful part with the features of the present invention.

Referring to the drawings provided, let's proceed to the detailed description of the invention. Referring more precisely to FIG. 1, the housing of the saw 1 includes a fastening screw 3 at one end, extending along the long axis of the housing, as shown, which may later be connected to a type of extension member, natural or non-natural 8. The said fastening screw 3 is fixed to the housing 1 by a rivet 5. In opened position as shown in FIG. 1, the fastening screw 3 is perpendicular to the base plate 7 immovably secured to the housing of the saw or the saw blade as shown in FIG. 3. The notch 11 in a side edge of the housing, allows for easy grasp of the fastening screw 3 to swing it into open position. The useful part of the tool 2 shows a saw.

Figure 2:
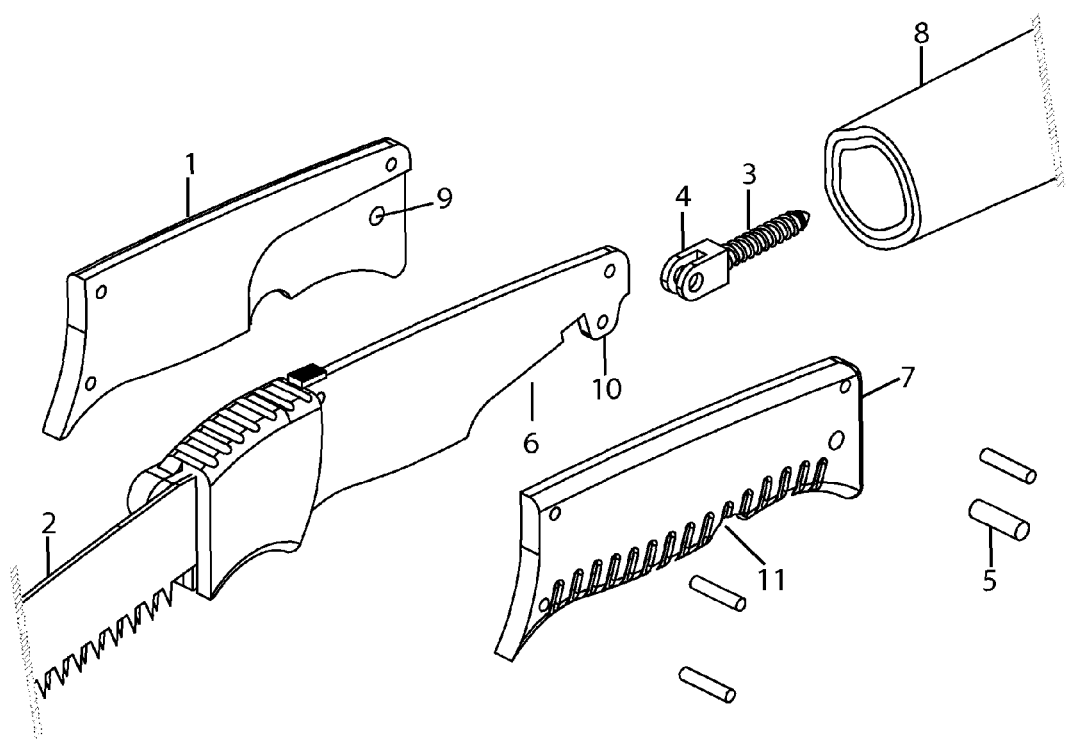
FIG. 2 is a partially exploded perspective view of an example of the extension fastener for portable tool attached to the base of the housing with the features of the present invention.

Referring now to FIG. 2, the extension of natural origin or not 8 is cut with using a blade 2 attached to the saw housing 1. Thereafter, the fastening screw 3 is driven into the extension of natural type or not 8 by rotation until the natural extension 8 leans firmly against the base plate 7. This base plate 7 must provide a flat face. FIG. 2 shows in detail how the pivoting system 4 of the fastening screw 3 is fixed to the housing of the saw with a rivet 5. The housing of the saw 1 provides a cylinder port 9 for the rivet 5. The pivot point is assured by the reinforcement 10. The housing of the saw 1 shows a receptacle 6 that can receive the fastening screw 3 when completely folded to ensure safe carrying.

It is agreed that actual tests defined the specifications of the preferred invention. As the environment of the hunter differs depending on the geographical location, several wood species were used as extensions 8 to determine the dimensions of the fastening screw 3. Experiments have revealed that diameters greater than ¼ inch cause splitting of the extensions of natural origin 8. The same phenomenon can be observed if the fastening screw 3 is longer than 1¼ inches and requires too much time or strength. Resistance to compressive and tension between the fastening screw 3 and the extension of the natural type or non 8 proved insufficient if the length of the fastening screw 3 is less than 1 inch.

The length of the saw housing 1 may be reduced in order to make an even more compact version since the fastening is provided by the fastening screw 3 fixed to the housing of the saw 1. For the understanding of the preferred invention, it is noted that the version shown in the drawings has a saw housing 1 of less than 16 mm in thickness to facilitate mailing. It is obvious that the preferred invention would be constructed with a housing 1 of more than 16 mm thick to offer more grip and also increase the surface of the base plate 7 thus providing a more stable lateral load. It is also understood that the saw blade 2 shown as an example in the drawings is detachable but could also be foldable, which does not change the principle of the described invention Referring now to FIG. 3, another possible configuration of the extension fastener. The fastening screw 3 affixed to the useful part of the tool 2, here a saw blade as an example. The useful part of the tool 2 ending with a base plate 7 providing support during the insertion of the fastening screw 3 in the extension of natural type or not 8. The fastening screw 3 also inserts inside the saw housing 1 having a threaded sleeve 18 adapted to the dimensions of the fastening screw 3 thus providing for safe carrying. In this configuration, only the useful part of the tool 2 is attached to the extension 8 of any diameter.

Figure 4:
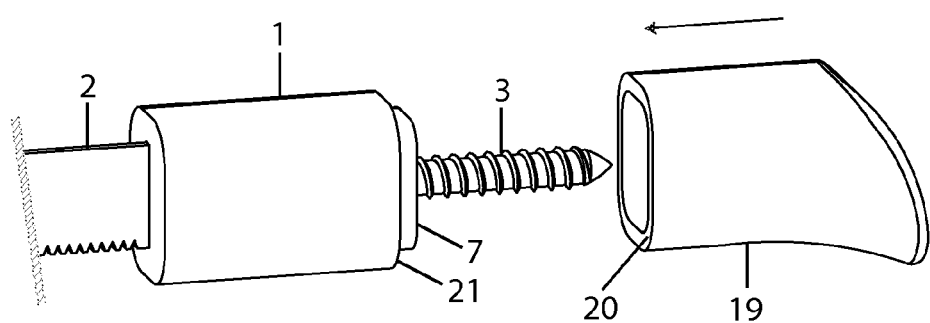
FIG. 4 is a perspective view of an example of the extension fastener for portable tool stowed in the housing with the features of the present invention.

Referring now to FIG. 4 showing an alternative configuration of the extension fastener. In this case, the fastening screws 3 would be contained within the housing of the tool 1. The said fastening screw 3 protected by a protective cap 19. The latter may be put into place by simple pressure, so that the edge 20 rests firmly against the outer face of the base plate 7 and the flange 21. One could also screw the cap 19 if threads were machined on the inside of the lip 20 and the outer walls of the base plate 7. The fastening screw 3 could be positioned near the useful portion 2 or the end of the housing 1. The fastening principal remains the same as the tool may be attached to extensions of the natural type or not 8 of any diameter.

Here are the claims for the invention described:

1. An extension fastener in combination with a portable hand tool, said hand tool having a housing, said housing constituting a handle to provide a firm hand grip, a useful part secured to one end of the housing to effect a function, a flat base plate immovably secured to an opposed end of the housing, a self-taping screw is secured to a pivot at said end opposed end the housing with said pivot spaced inwardly of said flat base plate to cause said self-taping screw to pivot in and out of said housing, said flat base plate being constituted by said opposed end of said housing being flat in sections thereof with said self-taping screw extending into said base plate when pivoted to extend perpendicular to said base plate, said self-taping screw being adapted to secure to a wood extension member by screwing said self-taping screw in an end of said wood extension member until said end rests firmly against said flat base plate to distribute lateral loads and provide resistance in traction and compression.

2. The extension fastener in combination with a portable tool as claimed in claim 1 wherein said extension member is a tree branch.

3. The extension fastener in combination with a portable tool as claimed in claim 1 wherein said self-taping screw has a length of between one inch to one and one quarter inch and a diameter not greater than one quarter inch to prevent splitting of said wood extension member when said self-taping screw is screwed in an end of said wood extension member.

4. The extension fastener in combination with a portable tool as claimed in claim 1 wherein said useful part is a saw blade.

* * * * *